United States Patent [19]

Tamura et al.

[11] Patent Number: 4,769,203
[45] Date of Patent: Sep. 6, 1988

[54] METHOD OF MANUFACTURING PNEUMATIC TIRES BY VULCANIZATION BUILDING

[75] Inventors: Akira Tamura, Iruma; Osamu Inoue, Sayama; Fusatoshi Sakaguchi, Tokyo, all of Japan

[73] Assignee: Bridgestone Corporation, Tokyo, Japan

[21] Appl. No.: 59,226

[22] Filed: Jun. 5, 1987

Related U.S. Application Data

[63] Continuation of Ser. No. 743,733, Jun. 12, 1985, abandoned.

[30] Foreign Application Priority Data

Jun. 18, 1984 [JP] Japan .................................. 59-123921
Jun. 18, 1984 [JP] Japan .................................. 59-123922

[51] Int. Cl.$^4$ ............................................. B29C 35/02
[52] U.S. Cl. .................................. 264/297.5; 264/315; 425/28.1
[58] Field of Search ..................... 264/501, 297.5, 315, 264/326; 425/28 R, 28 D, 47, 195

[56] References Cited

U.S. PATENT DOCUMENTS

| | | | |
|---|---|---|---|
| 1,899,258 | 2/1933 | Bush | 425/195 |
| 1,907,026 | 5/1933 | Woock | 264/315 |
| 3,999,907 | 12/1976 | Pappas | 425/28 D |

FOREIGN PATENT DOCUMENTS

| | | | |
|---|---|---|---|
| 1585100 | 1/1970 | France | 425/28 D |
| 236762 | 7/1925 | United Kingdom | 425/47 |

*Primary Examiner*—Jan H. Silbaugh
*Assistant Examiner*—Neil M. McCarthy
*Attorney, Agent, or Firm*—Sughrue, Mion, Zinn, Macpeak & Seas

[57] ABSTRACT

A method of manufacturing pneumatic tires of different tread patterns by vulcanization building in full mold process is disclosed, which comprises providing a pair of mold members separable at a plane inclusive of a parting face perpendicular to the rotary axis of the tire, determining at least two joining position on these mold members at regular intervals, and properly selecting the joining position of each mold member so as to provide a different tread pattern.

9 Claims, 5 Drawing Sheets

FIG_3b
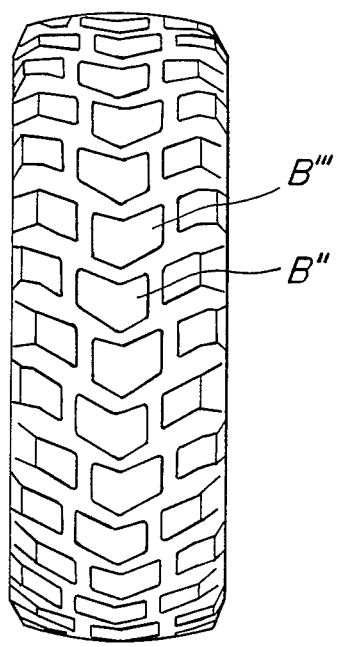
FIG_3a
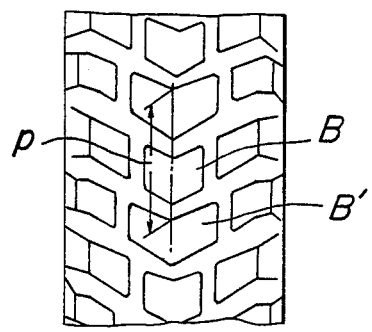
FIG_3c
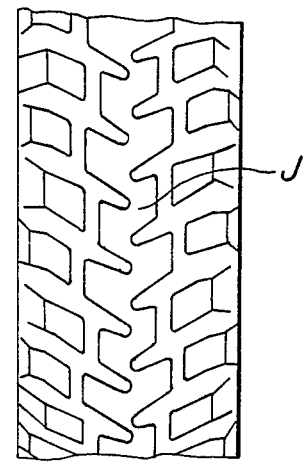

FIG_7a
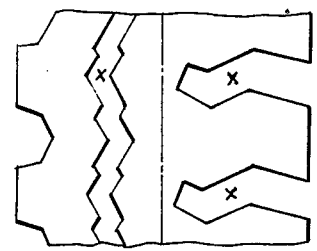
FIG_7b
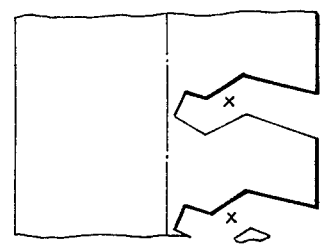

METHOD OF MANUFACTURING PNEUMATIC TIRES BY VULCANIZATION BUILDING

This is a continuation of Ser. No. 743,733, filed on June 12, 1985 and now abandoned.

BACKGROUND OF THE INVENTION

1. Field of the Invention

This invention relates to the manufacture of pneumatic tires, particularly superlarge, heavy load tires typified by so-called OR tires. More particularly, it relates to a method of advantageously and simply manufacturing pneumatic tires having different tread patterns in the same newly-devised mold at the step of vulcanization building.

2. Description of the Prior Art

Among the heavy duty tires of this type, superlarge tires or OR tires are used in vehicles for self-running of public works and construction machines. The number of such tires in terms of production is fairly small as compared with TB tires for heavy load truck and bus. Moreover, the tires are different from each other in the required performances and application. However, meeting the delicate situation in accordance with these performance and application differences is difficult in view of economical reasons, so that the OR tires are uniformly manufactured having a few kinds of tread patterns. As a result, these tires are often obliged to be insufficient in required performance.

In general, a mold for tire building corresponds to one size and tread pattern of the tire and can merely be subjected to slight change in accordance with the presence of at most a sipe. On the other hand, the mold for superlarge tire such as OR tire amounts to several ten thousand dollars for each mold. Therefore, if the OR tires satisfy the different required performances in accordance with various applications, a considerably enormous cost is required in order to provide various tread patterns.

SUMMARY OF THE INVENTION

It is an object of the invention to provide a method of manufacturing a pneumatic tire by vulcanization building, which sufficiently satisfies the required performances in accordance with the application purpose without excessive investment, by using a mold with a general-purpose tread pattern in tire building to effectively and properly change the state of the tread pattern.

According to the invention, there is the provision of a method of manufacturing a pneumatic tire by vulcanization building in a full mold process, which comprises providing a pair of mold members to be joined and separated at a plane inclusive of a parting face perpendicular to the rotary axis of the tire, determining at least two joining positions on said mold members at regular intervals along an outer periphery of a tire to be manufactured, and selecting the joining position of each mold member to provide a different tread pattern.

In the preferred embodiment of the invention, one of the joining positions takes part in the formation of a tread pattern having transverse grooves arranged in a direction intersecting with the plane inclusive of the parting face between the mold members and land portions defined therebetween. The transverse groove and land portion have widths corresponding to 3-20% and 15-35% of the tread width on the mid-circumference of the tread, respectively. The interval between adjacent joining positions is larger than the width of the transverse groove but smaller than the width of the land portion. Further, the land portion is provided at the groove wall of the transverse groove near the area intersecting to the plane inclusive of the parting face with a slight bulging part having an arc profile smoothly connecting the groove wall to the plane. Such an arc profile has a radius of curvature corresponding to not less than 10% of the width of the transverse groove. Moreover, the transverse groove is provided at its groove bottom near the area intersecting to the plane inclusive of the parting face with a slight convex part having an arc profile smoothly connecting the groove bottom to the plane, which profile having a radius of curvature corresponding to not less than 10% of the depth of the transverse groove. Preferably, the tread pattern is a lug type pattern defined by a plurality of transverse grooves each continuously extending between both side edges of the tread.

The term "full mold in the vulcanization building of pneumatic tires" used herein means a pair of mold members to be joined and separated at a plane inclusive of a parting face perpendicular to the rotary axis of the tire, and is distinguished from a segmentary mold being a combination of plural mold segments separated at given intervals along the outer periphery of the tire.

BRIEF DESCRIPTION OF THE DRAWINGS

FIGS. 3a to 3c are schematically elevational views of the tire having different tread patterns, respectively; and FIGS. 4 to 7 are partial developed views of the other tread patterns in the tires, respectively.

DETAILED DESCRIPTION OF THE INVENTION

Figure 1:
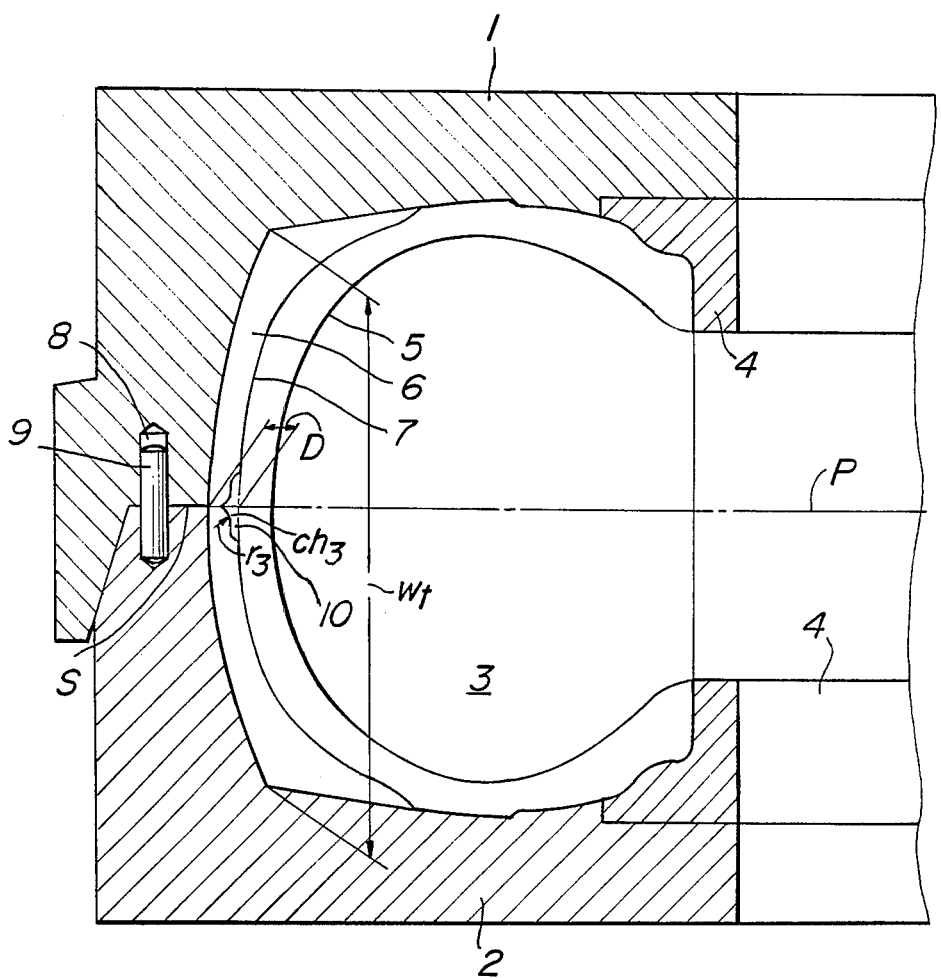
FIG. 1 is a sectional view of an embodiment of the mold used in the invention.

In FIG. 1 illustrates an embodiment of the full mold used in the invention, which usually comprises a pair of mold members 1 and 2 forming an inner cavity 3 for molding by joining at a mid-circumferential plane P of a tire as a parting face S, a pair of mold rings 4 for the bead fitted to the inner peripheries of the mold members, and a bladder 5. In the cavity 3 of the illustrated embodiment, deep recesses 6 for the formation of lug are cut into an inner face 7 of the mold constituting the bottom of the transverse groove. Moreover, numeral 8(8') is a positioning hole and numeral 9 is a positioning dowel.

Figure 2A:
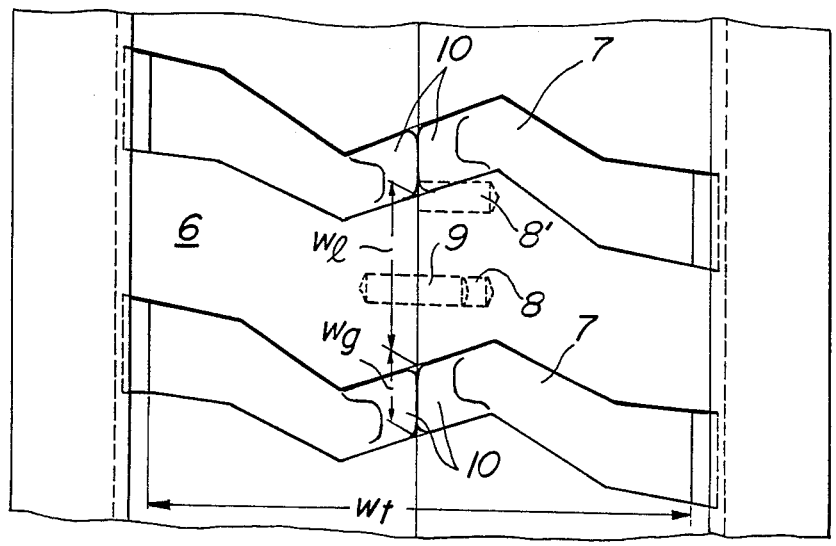
FIGS. 2a and 2b are partial views from the inside of the mold at different joining positions, respectively.

A projection of the inner face 7 at normal joining position of FIG. 1 is shown in FIG. 2a. Further, FIG. 2b shows a projection of the inner face of the mold for the tire to be manufactured at a second joining position separated away from the normal joining position along the outer periphery of the tire.

Figure 2B:
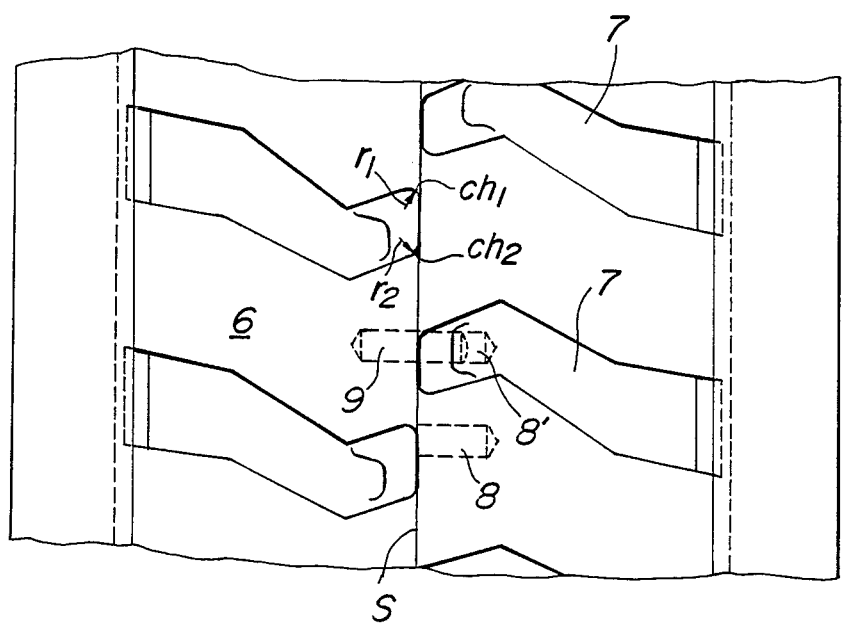

As apparent from FIGS. 2a and 2b, the selection of the joining position provides a lug type tread pattern wherein the tread is divided into lugs by transverse grooves each continuously extending from one side edge of the tread to the other side edge thereof, or another lug type tread pattern wherein the tread is divided into zigzag lugs by zigzag-arranged transverse grooves each extending from a side edge of the tread to the mid-circumference of the tire.

In these tread patterns, the width of the transverse groove ($w_g$) and the width of the lug or land portion ($w_l$) are preferable to be 3-20% and 15-35% of tread width ($w_t$) in a tire to be manufactured, respectively. In this case, $w_g$ is preferably smaller than $w_l$. Moreover, the widths $w_g$ and $w_l$ are measured on the mid-circumference of the tire, respectively.

In the zigzag arrangement of the transverse grooves as shown in FIG. 2b, the groove wall and groove bottom at the dead end of the transverse groove intersect at an angle of about 90° with respect to the central edge face of the land portion formed at the parting face S of the tire, so that there is a potential for causing stress concentration at internal corner parts of the transverse groove in the product tire.

In this connection, the cavity 3 is provided near such an area that the land portions of the finished tire intersect to the plane inclusive of the parting face S at the groove wall of the transverse groove with chamfers $ch_1$ and $ch_2$ each forming a slight bulging part which has an arc profile smoothly connecting the groove wall to the plane. The arc profiles of the chamfers $ch_1$ and $ch_2$ have preferably radii of curvature $r_1$ and $r_2$ corresponding to about 10% or more of the standard width $w_g$ of the transverse groove on the mid-circumference of the tire, respectively. On the other hand, the cavity 3 is provided near such an area that the groove bottom of the transverse groove intersects to the plane inclusive of the parting face S with a chamfer $ch_3$ forming a slight convex part which has an arc profile smoothly connecting the groove bottom to the plane. The arc profile of the chamfer $ch_3$ has a radius of curvature $r_3$ corresponding to about 10% or more of a standard groove depth D previously set on the mid-circumference of the tire (see FIG. 1). Moreover, it is preferable that a shallow recess 10 forming a so-called platform at the chamfer $ch_3$ is disposed inside the cavity 3.

Thus, the transverse groove of the product tire formed at the joining position between the mold members 1 and 2 as shown in FIG. 2b connects at the groove wall and groove bottom of its dead end to the central edge face of the lug through rounded corners, so that there is no fear on the generation of stress concentration as in the sharp corner part. Moreover, in the joining position of FIG. 2a, only slight knife edges are formed on the groove bottom and groove wall in the product tire, which do not produce any particular drawbacks.

Although the above description is described with respect to the lug type tread pattern, the invention is applicable to various tread patterns, for example, as shown in FIGS. 3a to 3c. That is, the block type pattern shown in FIG. 3a is an alternating arrangement of small herringbone block unit B and large herringbone block unit B' on the mid-circumference of the tire at a pitch p. When the joining position between the mold members is shifted by a half pitch ($\frac{1}{2}$p) from the state of FIG. 3a in the circumferential direction of the tire, there is obtained another block type pattern comprising an alternating arrangement of different herringbone block units B'' and B''' as shown in FIG. 3b. On the other hand, when the joining position is shifted from the state of FIG. 3a only by a quarter pitch ($\frac{1}{4}$p) in the circumferential direction, there is obtained a variant pattern comprising a center rib J on the mid-circumferential portion of the tread as shown in FIG. 3c. In the center rib-side block composite pattern of FIG. 3c, it is desirable that the bulging part and convex part as in FIGS. 1 and 2 are applied to the dead end of the transverse groove formed by cutting out from the center rib J.

Figure 4A:
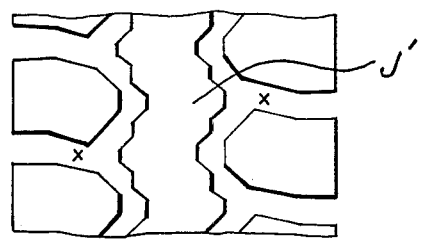
Figure 4B:
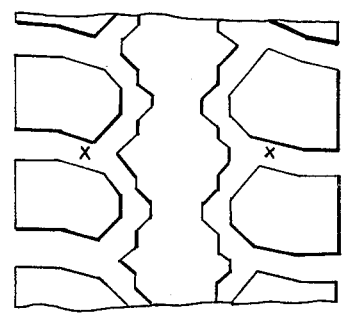
Figure 5A:
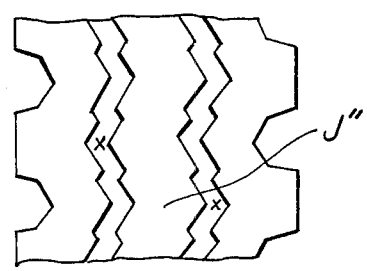
Figure 5B:
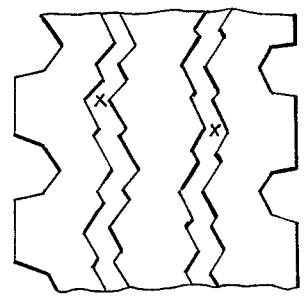

In addition to the lug or block type pattern as mentioned above, the invention is further applicable to a rib-lug type pattern as shown in FIG. 4 and a rib type pattern as shown in FIG. 5. That is, the zigzag arrangement of the center rib J' or J'' can be changed by shifting the joining position between the mold members on the mid-circumference of the tire in the circumferential direction thereof from FIG. 4a or 5a to FIG. 4b or 5b. Since such a change of the zigzag arrangement affects uneven wear, the application of the invention is particularly advantageous when the judgment of propriety on the appearance of the tire in the examination and determination of marketable tread patterns is performed together with the reduction of uneven wear.

According to the invention, when the distance from a certain joining position to another joining position is x mm, different tread patterns as previously mentioned can easily be obtained in the same mold in accordance with the value of x. In this case, the same pattern naturally appears at x+np, wherein p is a pitch length of the lug or block arrangement and n is an arbitrary integer. That is, the invention offers remarkable convenience when considering the reduction degree of uneven wear and the like accompanied with the change of the joining position at not only the manufacturing stage but also the examination stage of the product tire.

The invention will be described with respect to actual examples of OR tire having a size of 14.00 R 25 according to FIGS. 1 and 2.

In these examples, the tread width $w_t$ is 320 mm, and the width of transverse groove $w_g$ and the width of lug $w_l$ are 40 mm and 100 mm as a standard value on the mid-circumference of the tire, respectively. That is, $w_g$ and $w_l$ are about 13% and about 31% of $w_t$, respectively. On the other hand, the groove depth D is 40 mm, the height of the platform extending over a width of 40 mm with respect to the mid-circumference is 25 mm, the radii of curvature $r_1$, $r_2$ and $r_3$ are 5 mm, respectively, and the distance between the adjacent joining positions along the periphery of the tire is 60 mm. Under the above conditions, there were formed a tread pattern A (FIG. 2a), wherein the transverse groove continuously extends from one side end of the tread to the other side end thereof, and a tread pattern B (FIG. 2b), wherein the transverse grooves are arranged in a zigzag so as to locate their dead ends on the mid-circumference of the tread.

Both the patterns are suitable for use in OR tires, particularly tires running on unimproved road surfaces, and have the following characteristics:

Pattern A (a) It is a so-called traction pattern;
(b) It is excellent in the traction performance; and
(c) It is fairly excellent in the slipping resistance on muddy road, particularly rugged muddy road as compared with the pattern B.

Pattern B (a) It is excellent in the cut resistance and wear resistance as a so-called rock pattern; and
(b) It is little in the lug chipping and uneven wear on hard road surface or on road including many stones which are apt to be generated in the pattern A.

Then, three OR tires having a size of 33.25 R 35 and different tread patterns as shown in FIGS. 3a to 3c were manufactured so as to satisfy the above conditions. These tires fundamentally satisfy performances required on unimproved road surfaces. Particularly, the pattern of FIG. 3a shows a strong traction performance, and the pattern of FIG. 3c is suitable for use on hard road surface near good road and is excellent in vibration resistance and wear resistance.

Although the invention is described with respect to the manufacture of tires having different tread patterns by the full mold process using a pair of mold members 1 and 2, tires having various tread patterns can economically be manufactured by providing plural pairs of upper and lower mold members and using a proper combination of the upper mold member selected from a given mold pair and the lower mold member selected from the remaining mold pairs.

The latter case is particularly effective for simply manufacturing tires each having an unsymmetrical pattern capable of satisfying separately required performances as a single tire. The term "unsymmetrical pattern" used herein means patterns other than point and axial symmetrical patterns between the tread halves at any rotational position with respect to the mid-circumference of the tread, which includes, for example, such a composite pattern that one half of the tread is a block pattern and the remaining half thereof is a rib pattern, and the like.

The selection on the combination of upper and lower mold members from the plural mold pairs is naturally based on the assumption that the sizes of the tires to be manufactured are the same. Even with the same tire size, there may be a slight difference in the inner diameter of the mold member among the plural mold pairs. Therefore, the inner diameter of the mold member is set to be common in at least new mold pairs, while a spacer ring having a proper profile is inserted into the inside of the existing mold pairs, whereby the selection range can be widened.

Figure 6A:
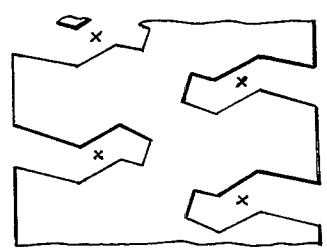
Figure 6B:
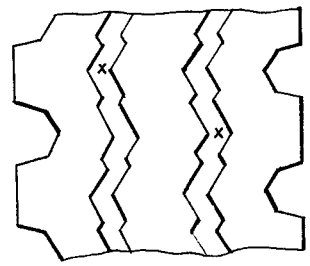

Then, unsymmetrical patterns C and D as shown in FIGS. 7a and 7b were formed by using a combination of a right-side mold member in a mold for lug pattern shown in FIG. 6a with a left-side mold member in a mold for rib pattern shown in FIG. 6b or smooth pattern (not shown).

The tire having such an unsymmetrical pattern is generally mounted on a vehicle wheel to direct the lug side outward with respect to the center of the vehicle. In this case, the pattern C is suitable for use in the running on unimproved road near good road surfaces because it can simultaneously possess the good traction performance at its outer side and the good high-speed running performance at its inner side as a single tire. On the other hand, the pattern D is suitable for use in loader, underground truck or the like because it can possess the good traction performance at its outer side and the wear resistance at its inner side.

Moreover, an unsymmetrical pattern obtained by combination of an outside lug pattern and an inside block pattern is suitable on bad road apart from good road as compared with the pattern C, while an unsymmetrical pattern obtained by combination of an inside rib pattern and an outside block pattern is suitable on bad road near good road.

In case of using the combination of two mold members selected from plural mold pairs, when either of such mold members serves to form a lug pattern, it is preferable to satisfy the requirements for the transverse groove, land portion and the like as previously mentioned.

According to the invention, tires having various tread patterns can easily be manufactured by simply selecting a proper joining position from two or more joining positions arranged on mold members at regular intervals in the mold pair at its parting face without newly manufacturing a mold for a tire to be manufactured in the change and adjustment from the basic tread pattern. As a result, the reduction of the cost for the mold, considerable decrease in the number of exchange steps required for attachment and detachment of mold member, and large reduction of storing space fee can be expected.

Further, by using a combination of upper and lower mold members selected from plural mold pairs and selecting the joining position of each of the mold members, various tread patterns inclusive of the unsymmetrical pattern can be produced very efficiently and economically even in the use of small number of mold pairs.

What is claimed is:

1. A method of manufacturing a pneumatic tire by vulcanization building using a full mold process comprising the steps of: providing a pair of mold members each having an internal tread pattern segment joined and separated at a plane inclusive of a parting face perpendicular to the rotary axis of the tire, providing said mold members with means to enable joining said mold members at at least two joining positions on said mold members, said joining positions comprising points on a plane inclusive of a parting face perpendicular to the axis of rotation of the tire, each of said joining positions corresponding to a different tread pattern for the tire, selecting a first of said joining positions, joining said mold members at the points on said plane corresponding to said first joining position, thereby forming a mold with a first of said tread patterns and vulcanizing at least one uncured tire in said mold to form a cured tire with said first tread pattern, removing said cured tire with said first tread pattern from said mold and selecting a second of said joining positions, moving said mold members relative to each other along said plane and joining said mold members at the points on said plane corresponding to said second joining position thereby forming a mold with a second of said tread portions and, vulcanizing an uncured tire in a mold defined by said mold members joined at said second joining position to form a cured tire with said second tread pattern.

2. The method according to claim 1, wherein one of said joining positions forms a tread pattern having transverse grooves arranged in a direction intersecting with said plane inclusive of the parting face between said mold members and land portions defined therebetween.

3. The method according to claim 2, wherein said transverse groove and land portion have widths corresponding to 3–20% and 15–35% of a tread width on the mid-circumference of the tread, respectively.

4. The method according to claim 2, wherein the interval between adjacent joining positions is larger than the width of the transverse groove but smaller than the width of the land portion.

5. The method according to claim 2, wherein said land portion is provided at the groove wall of said transverse groove near an area intersecting to said plane inclusive of the parting face with a slight bulging part having an arc profile smoothly connecting the groove wall to said plane.

6. The method according to claim 5, wherein said arc profile has a radius of curvature corresponding to not less than 10% of the width of the transverse groove.

7. The method according to claim 2, wherein said transverse groove is provided at its groove bottom near an area intersecting to said plane inclusive of the parting face with a slight convex part having an arc profile smoothly connecting said groove bottom to said plane.

8. The method according to claim 7, wherein said arc profile has a radius of curvature corresponding to not less than 10% of the depth of the transverse groove.

9. The method according to claim 2, wherein said transverse groove continuously extends between both side ends of the tread to define a lug type tread pattern.

* * * * *